(12) United States Patent
Tanae et al.

(10) Patent No.: US 7,972,157 B2
(45) Date of Patent: Jul. 5, 2011

(54) ELECTRICAL CONNECTION DEVICE

(75) Inventors: Masahiro Tanae, Okazaki (JP);
Tatsuyuki Uechi, Toyoake (JP);
Hiromichi Agata, Nishio (JP); Tomoo Atarashi, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 12/850,741

(22) Filed: Aug. 5, 2010

(65) Prior Publication Data

US 2011/0065298 A1 Mar. 17, 2011

(30) Foreign Application Priority Data

Sep. 11, 2009 (JP) ................................ 2009-210767

(51) Int. Cl.
*H01R 29/00* (2006.01)
(52) U.S. Cl. ...................................................... 439/189
(58) Field of Classification Search .......... 439/186–189, 439/208, 212, 720
See application file for complete search history.

(56) References Cited

U.S. PATENT DOCUMENTS

| 6,166,498 | A | 12/2000 | Yamaguchi et al. | |
| 6,533,696 | B1 | 3/2003 | Takenaka et al. | |
| 7,722,372 | B2 * | 5/2010 | Matsumoto et al. | 439/213 |
| 2009/0023345 | A1 | 1/2009 | Matsumoto et al. | |

FOREIGN PATENT DOCUMENTS

| JP | U-1-127172 | 8/1989 |
| JP | A-2000-217205 | 8/2000 |
| JP | A-2001-119810 | 4/2001 |
| JP | A-2004-312925 | 11/2004 |
| JP | A-2004343960 | 12/2004 |
| JP | A-2007-221962 | 8/2007 |
| JP | A-2009-070656 | 4/2009 |
| JP | A-2009-140705 | 6/2009 |
| WO | WO 2006/030732 A1 | 3/2006 |

OTHER PUBLICATIONS

Oct. 12, 2010 International Search Report issued in PCT/JP2010/062043 (with translation).

* cited by examiner

*Primary Examiner* — Javaid Nasri
(74) *Attorney, Agent, or Firm* — Oliff & Berridge, PLC

(57) ABSTRACT

The present invention relates to an electrical connection device that connects a rotating electrical machine and an inverter within a housing. The electrical connection device is configured with a first bus bar connected to a terminal of the rotating electrical machine such that the first bus bar that is insulated from the housing, and a second bus bar that is connected to a terminal of the inverter device such that the second bus bar is also insulated from the housing. An insulating connection member is configured to connect the first bus bar and the second bus bar. The first bus bar and second bus bar are housed within the housing such that they face each other to form a gap between them. The connection member is configured to pass through a wall of the housing so as to electrically connect the first and second bus bars.

20 Claims, 7 Drawing Sheets

US 7,972,157 B2

ELECTRICAL CONNECTION DEVICE

INCORPORATION BY REFERENCE

The disclosure of Japanese Patent Application No. 2009-210767 filed on Sep. 11, 2009 including the specification, drawings and abstract is incorporated herein by reference in its entirety.

BACKGROUND OF THE INVENTION

The present invention relates to an electrical connection device for electrically connecting a rotating electrical machine and an inverter device in a case that accommodates the rotating electrical machine and the inverter device that controls the rotating electrical machine.

DESCRIPTION OF THE RELATED ART

In recent years, an electric vehicle having a rotating electrical machine as a driving source of the vehicle, and a hybrid vehicle having an engine and a rotating electrical machine as a driving source of the vehicle have received attention in terms of fuel consumption, environmental protection, and the like. A drive device for use in such vehicle requires an inverter device for controlling the rotating electrical machine. The rotating electrical machine and the inverter device are electrically connected in a case that accommodates the rotating electrical machine and the inverter device. Typically, the rotating electrical machine and the inverter device are electrically connected together by connecting terminals of the rotating electrical machine and terminals of the inverter device together by connection conductors such as bus bars. As an example of this structure, Japanese Patent Application Publication No. JP-A-2001-119810 shows an electrical connection structure between two rotating electrical machines and an inverter device in a hybrid drive device.

In the hybrid drive device shown in Japanese Patent Application Publication No. JP-A-2001-119810, one ends of lead wires as connection conductors for the rotating electrical machines are connected to terminals of the rotating electrical machines, and one ends of lead wires as connection conductors for the inverter device are connected to terminals of the inverter device. The other ends of the lead wires for the rotating electrical machines and the other ends of the lead wires for the inverter device are connected to terminals as connection members, whereby the rotating electrical machines and the inverter device are electrically connected together. At this time, the other ends of the lead wires for the rotating electrical machines and the other ends of the lead wires for the inverter device are connected and fixed to the terminals by fastening with bolts that are screwed into bolt holes formed in the terminals. That is, in the hybrid drive device described in Japanese Patent Application Publication No. JP-A-2001-119810, an electrical connection device for electrically connecting the rotating electrical machines and the inverter device is formed by the lead wires for the rotating electrical machines, the lead wires for the inverter device, the terminals, and the plurality of bolts and bolt holes.

SUMMARY OF THE INVENTION

However, in the electrical connection device and the connection structure thereof in the hybrid drive device of Japanese Patent Application Publication No. JP-A-2001-119810, the labor required to perform the bolt fastening operation increases as the number of portions to be fastened by the bolts increases. Moreover, in order to suppress an increase in size of the drive device while securing a space for fastening with the bolts within the case, the bolts need to be fastened in a predetermined order, which complicates the bolt fastening operation. On the contrary, in order to separate the rotating electrical machines and the inverter device from each other for, e.g., maintenance such as inspection or service, the bolts need to be sequentially removed in a state in which the space inside the case having a separable structure is open to the outside, which also complicates the separating operation. Moreover, in the connection structure of Japanese Patent Application Publication No. JP-A-2001-119810, the lead wires, which are subjected to a high voltage, and the terminals are directly connected together by the bolts. Thus, this connection structure does not reliably ensure the safety especially in the operation of removing the bolts, which is often performed after a high voltage is applied. Thus, an interlock mechanism needs to be separately provided, which increases cost.

Thus, it is desired to implement an electrical connection device capable of electrically connecting and disconnecting a rotating electrical machine and an inverter device to and from each other in a case in a simple and safe manner.

According to a first aspect of the present invention, an electrical connection device for electrically connecting a rotating electrical machine and an inverter device in a case that accommodates the rotating electrical machine and the inverter device that controls the rotating electrical machine has a characteristic structure that includes: a first bus bar connected to a terminal of the rotating electrical machine in a state in which the first bus bar is insulated from the case; a second bus bar connected to a terminal of the inverter device in a state in which the second bus bar is insulated from the case; and an insulating connection member that connects the first bus bar and the second bus bar. In the electrical connection device, the first bus bar and the second bus bar have opposing portions, respectively, and in a state in which the first bus bar and the second bus bar are accommodated in a space inside the case, which is isolated from outside by the case, the opposing portions of the first bus bar and the second bus bar are positioned so as to face each other with a gap therebetween, and the connection member enters the space inside the case through a wall of the case, and pinches the opposing portions of the first bus bar and the second bus bar to electrically connect between the opposing portions.

With this characteristic structure, the rotating electrical machine and the inverter device can be easily electrically connected together in the case by a simple structure, that is, by merely advancing the connecting member into the case to pinch the opposing portions of the first bus bar and the second bus bar. Moreover, the rotating electrical machine and the inverter device can be easily electrically disconnected from each other in the case by a simple structure, that is, by merely withdrawing the connecting member to release the opposing portions of the first bus bar and the second bus bar.

An operation of electrically connecting and disconnecting the rotating electrical member and the inverter device to and from each other can be performed by advancing and withdrawing the insulating connection member, rather than by directly connecting and disconnecting the opposing portions of the first bus bar and the second bus bar to and from each other with bolts or the like. This increases safety of the operation.

Thus, the present invention can provide an electrical connection device capable of electrically connecting and disconnecting a rotating electrical machine and an inverter device in a case in a simple and safe manner.

Note that, according to the above characteristic structure, the opposing portions of the first bus bar and the second bus bar are electrically connected together by pinching these opposing portions. This is advantageous in that errors (tolerances) of the dimensions of the first bus bar and the second bus bar, and the attachment positions thereof can be more easily absorbed by adjusting the amount of overlap (the overlapping area) between the opposing portions of the first and second bus bars, as compared to the case where the first bus bar and the second bus bar are connected and fixed by bolts. Moreover, the opposing portions of the first bus bar and the second bus bar, which are positioned so as to face each other, are pinched and brought into contact with each other. Thus, the opposing portions of the first bus bar and the second bus bar do not slide on each other in the surface contact state, whereby reliability of the contact portion can be increased.

According to a second aspect of the present invention, a direction in which the terminal of the rotating electrical machine and the terminal of the inverter device are connected may be a connection direction, each of the first bus bar and the second bus bar may have a connection direction extending portion that extends along the connection direction, and a crossing direction extending portion that extends continuously from the connection direction extending portion toward the wall of the case along a crossing direction that crosses the connection direction, the crossing direction extending portions of the first bus bar and the second bus bar may respectively serve as the opposing portions that face each other in a direction perpendicular to the crossing direction, and the connection member may enter the space inside the case along the crossing direction to pinch the opposing portions of the first bus bar and the second bus bar.

With this structure, the opposing portions of the first bus bar and the second bus bar extend in the crossing direction, and face each other with a gap therebetween, and the connection member is moved along the crossing direction so as to enter the case through the wall of the case. Thus, the opposing portions of the first bus bar and the second bus bar can be easily pinched from the case side by the connection member. Moreover, it is possible that the single connection member easily pinches the opposing portions of the first bus bar and the second bus bar without cooperating with other members.

According to a third aspect of the present invention, the connection member may include a main body made of an insulating material, a pinching portion provided on a front side of the main body in an entering direction in which the connection member enters the space inside the case, and a fixing portion that fixes the main body to the case, the main body may be formed so that the main body can be inserted into an opening formed in the case, and the pinching portion may pinch the opposing portions of the first bus bar and the second bus bar as the main body moves forward in the entering direction.

With this structure, the pinching portion is provided on the front side of the main body in the entering direction. Thus, the pinching portion that pinches the opposing portions of the first bus bar and the second bus bar as the main body is moved forward in the entering direction through the opening formed in the case can be appropriately structured. Moreover, the main body can be appropriately fixed to the case by the fixing portion. Since the main body is made of an insulating material, the first bus bar and the second bus bar can be appropriately insulated from the case when the rotating electrical machine and the inverter device are electrically connected together by pinching the opposing portions of the first bus bar and the second bus bar by the pinching portion.

According to a fourth aspect of the present invention, the connection member may be structured so as to enter the space inside the case through the opening in a state in which the space inside the case communicates with the outside only through the opening, and the connection member may have a stopper mechanism that prevents the connection member from coming off from the case in a state in which the main body is moved backward in the entering direction and the opposing portions of the first bus bar and the second bus bar are released from the pinching portion.

With this structure, the connection member enters the space inside the case through the opening in the state in which the space inside the case communicates with the outside only through the opening. Thus, the space inside the case is not accessible from the outside of the case except through the opening. Thus, the first bus bar and the second bus bar, which are subjected to a high voltage, are not accessible from any portion other than the opening during an operation of connecting and disconnecting the first bus bar and the second bus bar to and from each other. This increases safety of the operation. Note that, in the present invention, the connection member enters the space inside the case through the opening of the case to pinch the opposing portions of the first bus bar and the second bus bar. Thus, even if the space inside the case communicates with the outside only through the opening, the first bus bar and the second bus bar can be appropriately electrically connected together by the connection member. Accordingly, the present invention is especially suitable for the structure in which the connection member is moved into the space inside the case through the opening in the state in which the space inside the case communicates with the outside only through the opening.

Since the connection member has the stopper mechanism, the connection member can be prevented from coming off from the case even if the main body moves further backward in the entering direction after the main body moves backward in the entering direction to release the opposing portions of the first bus bar and the second bus bar from the pinching portion. Thus, the connection member is always positioned at the opening. This limits access to the first bus bar and the second bus bar through the opening, whereby the safety of the operation of connecting and disconnecting the first bus bar and the second bus bar to and from each other can further be increased. This structure eliminates the need to separately provide an interlock mechanism in order to ensure safety. This can simplify the structure of a device that incorporates the electrical connection device therein, and can also reduce cost.

Note that, in this case, a gap between the opening and the main body may be less than an average thickness of an adult's finger in the state in which the opposing portions of the first bus bar and the second bus bar are released from the pinching portion. This structure is more preferable because it substantially reliably prevents access to the first bus bar and the second bus bar through the opening.

According to a fifth aspect of the present invention, the connection member may have a seal mechanism that seals the connection member and the case in a fluid-tight manner in a state in which the main body is moved forward in the entering direction and the opposing portions of the first bus bar and the second bus bar are pinched by the pinching portion.

With this structure, the seal mechanism can reduce the possibility that a liquid such as water or oil enters the space inside the case through a gap between the connection member and the case. Thus, the inverter device accommodated in the space inside the case can be appropriately protected.

According to a sixth aspect of the present invention, the fixing portion may be formed by a fastening bolt, which extends in the crossing direction, inserted through the main body, and screwed into a bolt fastening hole formed in the case, and as the fastening bolt is screwed into the bolt fastening hole, the main body may be moved forward in the entering direction along the crossing direction.

With this structure, the fixing portion of the connection member can be formed in a simple manner by using the fastening bolt that is screwed into the bolt fastening hole formed in the case. In this case, since the fastening bolt, which is inserted through the main body, is provided so as to extend in the crossing direction, the main body can be easily advanced and withdrawn along the entering direction by merely screwing the fastening bolt into or out of the bolt fastening hole. Moreover, the main body can be easily fixed to the case by screwing the fastening bolt deep into the bolt fastening hole.

According to a seventh aspect of the present invention, the pinching portion may be formed by a clip member that is capable of pressing the opposing portions of the first bus bar and the second bus bar toward each other.

With this structure, the clip member presses the opposing portions of the first bus bar and the second bus bar toward each other to bring the first bus bar and the second bus bar into contact with each other. Thus, the rotating electrical machine and the inverter device can be electrically connected together in a simple and appropriate manner.

According to an eighth aspect of the present invention, the gap between the opposing portions of the first bus bar and the second bus bar may be set such that electrical insulation between the first bus bar and the second bus bar can be ensured in a state in which the rotating electrical machine and the inverter device are positioned and fixed in the space inside the case.

With this structure, when released from the connection member, the opposing portions of the first bus bar and the second bus bar are separated from each other by the gap large enough to ensure electrical insulation therebetween. Thus, the rotating electrical machine and the inverter device can be more reliably electrically disconnected from each other, whereby safety can be more reliably ensured.

According to a ninth aspect of the present invention, a plurality of pairs of the first bus bar and the second bus bar may be provided, and the single connection member may pinch all of the opposing portions of the plurality of pairs of the first bus bar and the second bus bar, which are positioned so as to adjoin each other.

With the above structure, in the case where a plurality of pairs of the first bus bar and the second bus bar are provided, such as in the case where an armature of the rotating electrical machine includes coils of a plurality of phases, or in the case where a plurality of rotating electrical machines are provided in the case, the number of steps in the operation of connecting and disconnecting the first bus bar and the second bus bar to and from each other is reduced as compared to the case where the connection member for pinching the opposing portions of the first bus bar and the second bus bar is provided for each pair of the first bus bar and the second bus bar. Thus, workability can be improved.

According to a tenth aspect of the present invention, the case may include a first case, and a second case fixedly fastened to the first case, the rotating electrical machine is fixed to the first case, and the inverter device may be fixed to the second case, and the first case and the second case may be separable from each other in a state in which the opposing portions of the first bus bar and the second bus bar are released from the connection member.

With this structure, the rotating electrical machine fixed to the first case, and the inverter device fixed to the second case can be separated from each other in a state in which the opposing portions of the first bus bar and the second bus bar are released from the connection member. This facilitates, e.g., maintenance such as inspection or service because maintenance work can be performed on an individual component (the rotating electrical machine or the inverter device), rather than being performed on the combination of the rotating electrical machine and the inverter device. This also facilitates replacement of parts due to failures or the like, because the parts can be individually replaced. This can reduce costs for maintenance and inspection, and for repair and replacement.

DETAILED DESCRIPTION OF THE EMBODIMENT

Figure 1:
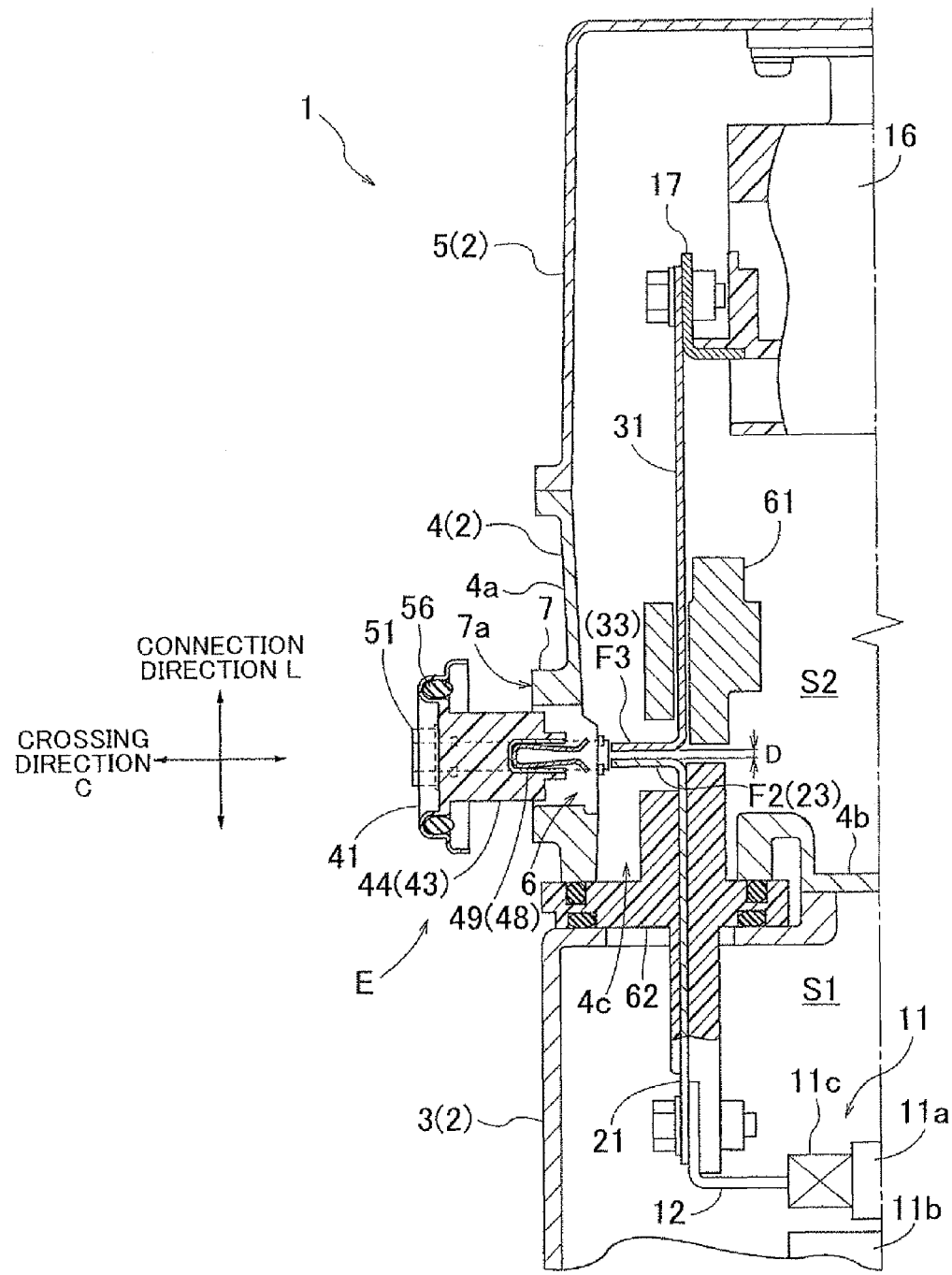
FIG. 1 is a partial cross-sectional view of a drive device according to an embodiment of the present invention, showing a state in which a connection member is moved backward in an entering direction.
Figure 2:
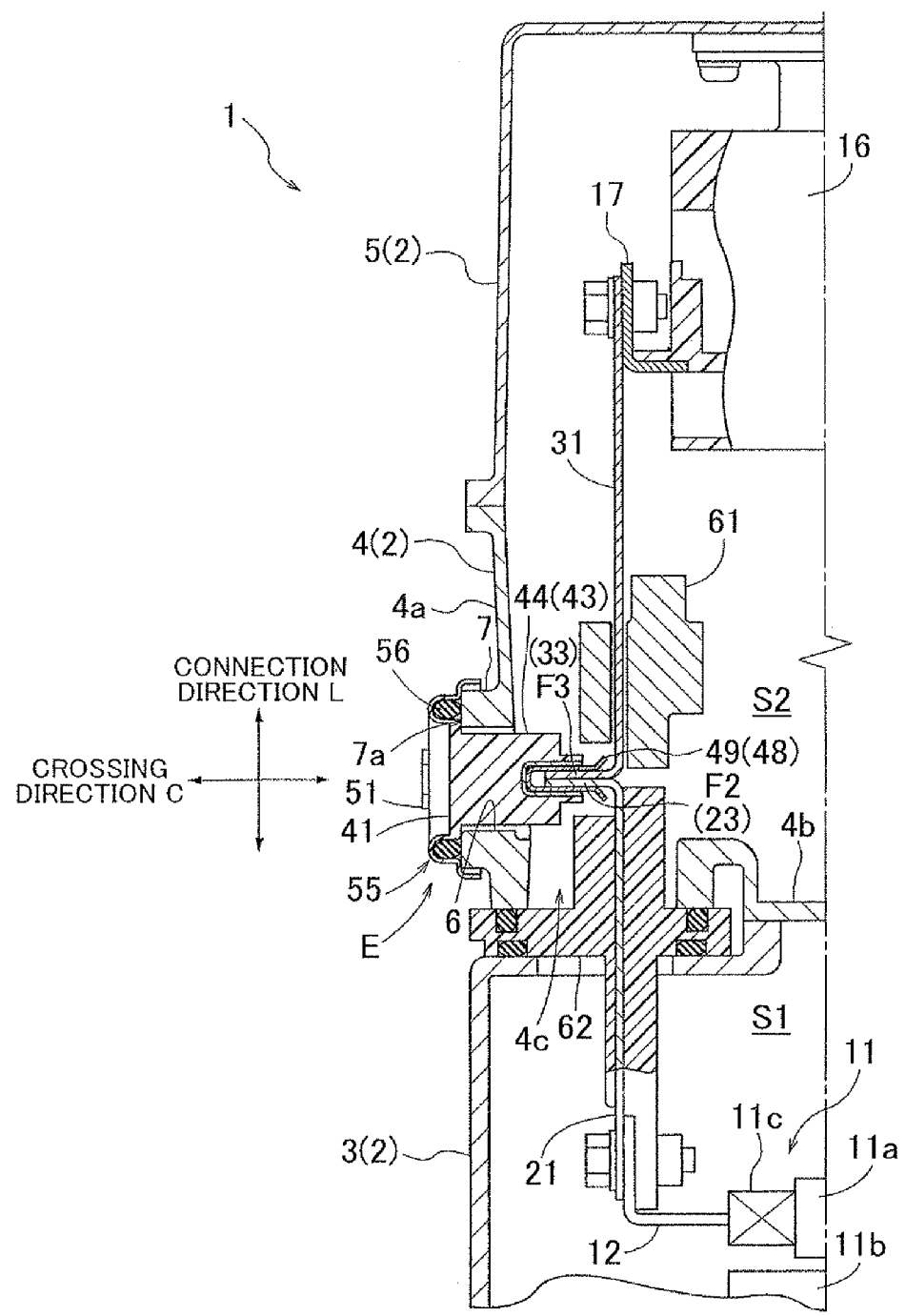
FIG. 2 is a partial cross-sectional view of the drive device according to the embodiment of the present invention, showing a state in which the connection member is moved forward in the entering direction.

An embodiment of an electrical connection device according to the present invention will be described below with reference to the accompanying drawings. An electrical connection device E of the present embodiment is applied to a vehicle drive device 1. The electrical connection device E is a device for electrically connecting a rotating electrical machine 11 and an inverter device 16 in a case 2 that accommodates the rotating electrical machine 11 and the inverter device 16. The electrical connection device E of the present embodiment includes: a first bus bar 21 connected to a terminal of the rotating electrical machine 11 (a rotating electrical machine terminal 12) in a state in which the first bus bar 21 is insulated from the case 2; a second bus bar 31 connected to a terminal of the inverter device 16 (an inverter terminal 17) in a state in which the second bus bar 31 is insulated from the case 2; and an insulating connection member 41 for connecting the first bus bar 21 and the second bus bar 31 together. As shown in FIGS. 1 and 2, in the electrical connection device E of the present embodiment having this structure, the first bus bar 21 and the second bus 31 are accommodated in the space inside the case 2, which is isolated from the outside by the case 2, that the first bus bar 21 and the second bus bar 31 have opposing portions F2, F3, respectively, which are positioned so as to face each other with a gap therebetween, and that the connection member 41 enters the space S inside the case 2 through a wall of the case 2, and pinches the opposing portion F2 of the first bus bar 21 and the opposing portion F3 of the second bus bar 31 to electrically connect the opposing portions F2, F3 together. This enables the rotating electrical machine 11 and the inverter device 16 to be electrically connected to and disconnected from each other in the case 2 in a simple and safe manner. The structure of each part of the electrical connection device E of the present embodiment will be described in detail below.

1. Structure of Drive Device

First, the structure of the vehicle drive device 1, to which the electrical connection device E of the present embodiment is applied, will be described. As shown in FIGS. 1 and 2, the drive device 1 includes at least one rotating electrical machine 11 that functions as a driving source of a vehicle, and an inverter device 16 for controlling the rotating electrical machine 11. In the present embodiment, the drive device 1 further includes another rotating electrical machine as a driving source, and is further drivingly coupled to an engine that also functions as a driving source. The drive device 1 is thus structured as a two-motor type hybrid drive device. Note that, in the present application, the two rotating electrical machines need not be distinguished from each other, and thus, are hereinafter collectively referred to as the "rotating electrical machines 11." The rotating electrical machines 11 and the inverter device 16 are accommodated in the case 2.

Figure 3:
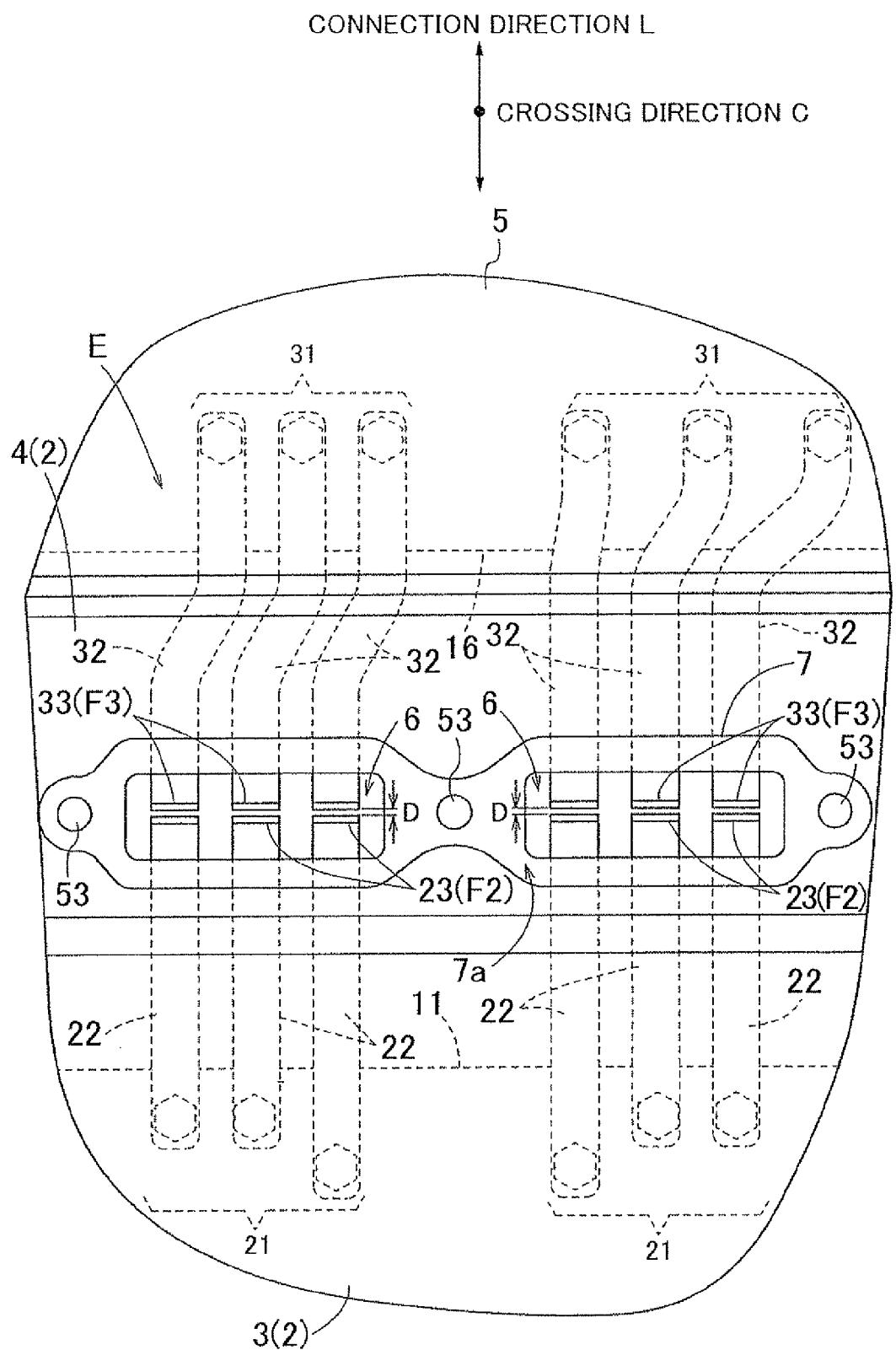
FIG. 3 is a side view of an electrical connection device according to the embodiment of the present invention.

In the present embodiment, the case 2 includes a drive device case 3, an inverter case 4 that is fixedly fastened to the drive device case 3, and an inverter cover 5 that is fixedly fastened to the inverter case 4. The drive device case 3 and the inverter case 4 are structured so as to be separable from each other, and the inverter case 4 and the inverter cover 5 are structured so as to be separable from each other. The inverter case 4 is attached to the drive device case 3 by fixing members such as bolts, and in this state, a motor accommodating space S1 for accommodating the rotating electrical machines 11 is formed inside the drive device case 3. The inverter cover 5 is also attached to the inverter case 4 by fixing members such as bolts, and in this state, an inverter accommodating space S2 for accommodating the inverter device 16 is formed inside the inverter case 4. In the present embodiment, the motor accommodating space S1 and the inverter accommodating space S2 form a "space inside the case" in the present invention. In the present embodiment, openings 6 are formed in a sidewall 4a of the inverter case 4 so that a main body 43 of the connection member 41, which is described below, can enter the inverter accommodating space S2 through the inverter case 4. In this example, two such openings 6 are formed as shown in FIG. 3.

The rotating electrical machines 11 are accommodated and fixed in the drive device case 3. Each rotating electrical machine 11 is structured to have a rotor 11a and a stator 11b, and is capable of functioning as a motor (a rotator) that is supplied with electric power and generates motive power, and as a generator (an electric generator) that is supplied with motive power and generates electric power. Thus, the rotating electrical machines 11 are electrically connected to an electric power accumulating device, not shown. A coil, not shown, is wound around the stator 11b. Connection wires are extended from a coil end 11b of the coil, which protrudes axially outside the stator 11b, whereby rotating electrical machine terminals 12 are formed as terminals of the rotating electrical machine 11. In the present embodiment, since the rotating electrical machine 11 is driven by a three-phase alternating current, three rotating electrical machine terminals 12 corresponding to the three phases are formed for one rotating electrical machine 11. Note that FIGS. 1 and 2 show only the portions that are necessary to describe the electrical connection device of the present invention. Although not shown in FIGS. 1 and 2, a drive transmission mechanism formed by a planetary gear unit and the like is accommodated in the drive device case 3, in addition to the rotational electrical machines 11. In the present embodiment, the drive device case 3 corresponds to a "first case" in the present invention.

The inverter device 16 is accommodated and fixed in the inverter case 4. The inverter device 16 controls the rotating electrical machines 11 by controlling three-phase alternating current (AC) power that is supplied to the rotating electrical machines 11. Although detailed description is omitted, the inverter device 16 includes a switching element module, a reactor, a capacitor, and the like, and is structured as an inverter unit by integrally assembling the switching element module, the reactor, the capacitor, and the like. In the present embodiment, connection wires are extended from the switching element module to form inverter terminals 17 as terminals of the inverter device 16. In the present embodiment, since the rotating electrical machines 11 are driven by a three-phase alternating current, three inverter terminals 17 corresponding to the three phases are formed for each rotating electrical machine 11. In the present embodiment, the inverter case 4 corresponds to a "second case" in the present invention.

In the present invention, the drive device 1 having the above structure includes the electrical connection device E as a device for electrically connecting the rotating electrical machines 11 and the inverter device 16 in the case 2.

2. Structure of Electrical Connection Device

The structure of the electrical connection device E will be described below. The electrical connection device E of the present embodiment includes first bus bars 21 connected to the rotating electrical machine terminals 12, second bus bars 31 connected to the inverter terminals 17, and a connection member 41 for connecting the first bus bars 21 and the second bus bars 31. Note that, in the following description, the direction in which the rotating electrical machine terminals 12 and the inverter terminals 17 are connected together is referred to as a connection direction L. In the present embodiment, as shown in FIGS. 1 and 2, the inverter terminal 17 is positioned above the rotating electrical machine terminal 12 in a vertical direction (the up-down direction in FIGS. 1 and 2), and this vertical direction corresponds to the connection direction L.

The first bus bars 21 are plate-like members made of a conductive material such as copper or aluminum, and are electrically connected to the rotating electrical machine terminals 12. In the present embodiment, each of the first bus bars 21 is structured to have a connection direction extending portion 22 extending along the connection direction L, and a crossing direction extending portion 23 extending along a crossing direction C that crosses the connection direction L. As shown in FIG. 3, the connection direction extending portion 22 is shaped so as to extend substantially parallel to the connection direction L. The connection direction extending portion 22 and the crossing direction extending portion 23 are provided so as to be continuous with each other. In this example, the connection direction extending portion 22 has a bent portion 24 (see FIGS. 4 and 5) on the side opposite to the rotating electrical machine terminal 12 (the upper side in FIGS. 1 and 2). At the bent portion 24, the connection direction extending portion 22 is bent toward the sidewall 4a of the inverter case 4 along a direction substantially perpendicular to the connection direction extending portion 22, so as to be continuous with the crossing direction extending portion 23. Thus, in the present embodiment, as shown in FIGS. 1 and 2, a horizontal direction (the left-right direction in FIGS. 1 and 2), which is substantially perpendicular to the connection direction L corresponding to the vertical direction, is the crossing direction C. Note that, as described below, the crossing direction extending portion 23 forms the opposing portion F2 of the first bus bar 21. In the present embodiment, since the rotating electrical machines 11 are driven by a three-phase alternating current, three first bus bars 21 corresponding to the three phases are provided for each rotating electrical machine 11. Thus, in this example, a total of six first bus bars 21 are provided for the two rotating electrical machines 11 (see FIG. 3).

The first bus bars 21 extend through a bottom wall 4b of the inverter case 4, and extend in the motor accommodating space S1 and the inverter accommodating space S2, so that the rotating electrical machines 11 and the inverter device 16 can be electrically connected together. As shown in FIGS. 1 and 2, a communication hole 4c is formed in the bottom wall 4b of the inverter case 4 so that the motor accommodating space S1 and the inverter accommodating space S2 communicate with each other through the communication hole 4c. All of the three first bus bars 21, which are arranged in parallel with each other, are held by a holding base 62 that is made of an insulating resin material (e.g., a polyphenylene sulfide (PPS) resin or an epoxy resin). In this state, the three first bus bars 21 extend through the communication hole 4c, whereby the three first bus bars 21 extend through the bottom wall 4b of the inverter case 4. The holding base 62 is fixed to the bottom wall 4b of the inverter case 4 by fastening members such as bolts.

The second bus bars 31 are plate-like members made of a conductive material such as copper or aluminum, and are electrically connected to the inverter terminals 17. In the present embodiment, each of the second bus bars 31 is structured to have a connection direction extending portion 32 extending along the connection direction L, and a crossing direction extending portion 33 extending along the crossing direction C. As shown in FIG. 3, the connection direction extending portion 32 is shaped so as to extend substantially parallel to the connection direction L, and to be offset by a predetermined amount toward one side in a direction perpendicular to the connection direction L and the crossing direction C (the left-right direction in FIG. 3; hereinafter sometimes referred to as the "lateral direction"). The connection direction extending portion 32 and the crossing direction extending portion 33 are provided so as to be continuous with each other. In this example, the connection direction extending portion 32 has a bent portion 34 on the side opposite to the inverter terminal 17 (the lower side in FIGS. 1 and 2). At the bent portion 34, the connection direction extending portion 32 is bent toward the sidewall 4a of the inverter case 4 along the crossing direction C substantially perpendicular to the connection direction extending portion 32, so as to be continuous with the crossing direction extending portion 33. Note that, as described below, the crossing direction extending portion 33 forms the opposing portion F3 of the second bus bar 31. In the present embodiment, since the rotating electrical machines 11 are driven by a three-phase alternating current, three second bus bars 31 corresponding to the three phases are provided for each rotating electrical machine 11. Thus, in this example, a total of six second bus bars 31 are provided for the two rotating electrical machines 11 (see FIG. 3).

The second bus bars 31 are fixed to the inverter terminals 17 of the inverter device 16 fixed to the inverter case 4, and are positioned only in the inverter accommodating space S2. Current sensors 61 are also fixed to the inverter case 4. In the inverter accommodating space S2, the three second bus bars 31, which are arranged in parallel with each other, are provided so as to extend through the current sensor 61 in the connection direction L. The current sensor 61 detects current values flowing in the three second bus bars 31, and detects instantaneous values of driving currents of the three phases for driving the rotating electrical machine 11. Note that two current sensors 61 are respectively provided for the two rotating electrical machines 11 (the two sets of three second bus bars 31).

Each of the first bus bars 21 and each of the second bus bars 31 have the opposing portions F that are positioned so as to face each other with a gap therebetween. In the present embodiment, the crossing direction extending portion 23 of the first bus bar 21 and the crossing direction extending portion 33 of the second bus bar 31 are positioned substantially parallel to each other with a predetermined gap D therebetween so as to face each other in a direction perpendicular to the crossing direction C (in this example, in a direction substantially corresponding to the connection direction L). The crossing direction extending portion 23 of the first bus bar 21 and the crossing direction extending portion 33 of the second bus bar 31 are the opposing portions F2, F3 of the first and second bus bar 21, 31. The gap D between the opposing portion F2 of the first bus bar 21 and the opposing portion F3 of the second bus bar 31 is determined so that at least electrical insulation between the first bus bar 21 and the second bus bar 31 can be ensured in a state in which the rotating electrical machines 11 are positioned and fixed in the motor accommodating space S1, and the inverter device 16 is positioned and fixed in the inverter accommodating space S2. Thus, in a state in which the rotating electrical machines 11 and the inverter device 16 are merely positioned and fixed in the case 2, no electrical conduction is provided between the first bus bar 21 and the second bus bar 31, and the rotating electrical machines 11 and the inverter device 16 are not electrically connected together.

Thus, the electrical connection device E of the present embodiment includes the connection member 41 for electrically connecting the rotating electrical machines 11 and the inverter device 16 by actively providing electrical conduction between the opposing portion F2 of the first bus bar 21 and the opposing portion F3 of the second bus bar 31.

The connection member 41 is a member that partially extends through the case 2 into the inverter accommodating space S2 along the crossing direction C, and pinches the opposing portions F2 of the first bus bars 21 and the opposing portions F3 of the second bus bars 31. In the present embodiment, as shown in FIG. 3, the two openings 6 are formed in the sidewall 4a of the inverter case 4. The connection member 41 is structured to be able to partially enter the inverter accommodating space S2 through the openings 6. In the present embodiment, the inverter case 4 is attached to the drive device case 3, and the inverter cover 5 is attached to the inverter case 4, so that the inverter accommodating space S2 communicates with the outside (the space outside the drive device 1) only through the openings 6 (that is, the entire inverter accommodating space S2 other than the openings 6 is isolated from the outside). The connection member 41 is structured to enter the inverter accommodating space S2 through the openings 6 in this state.

Figure 4:
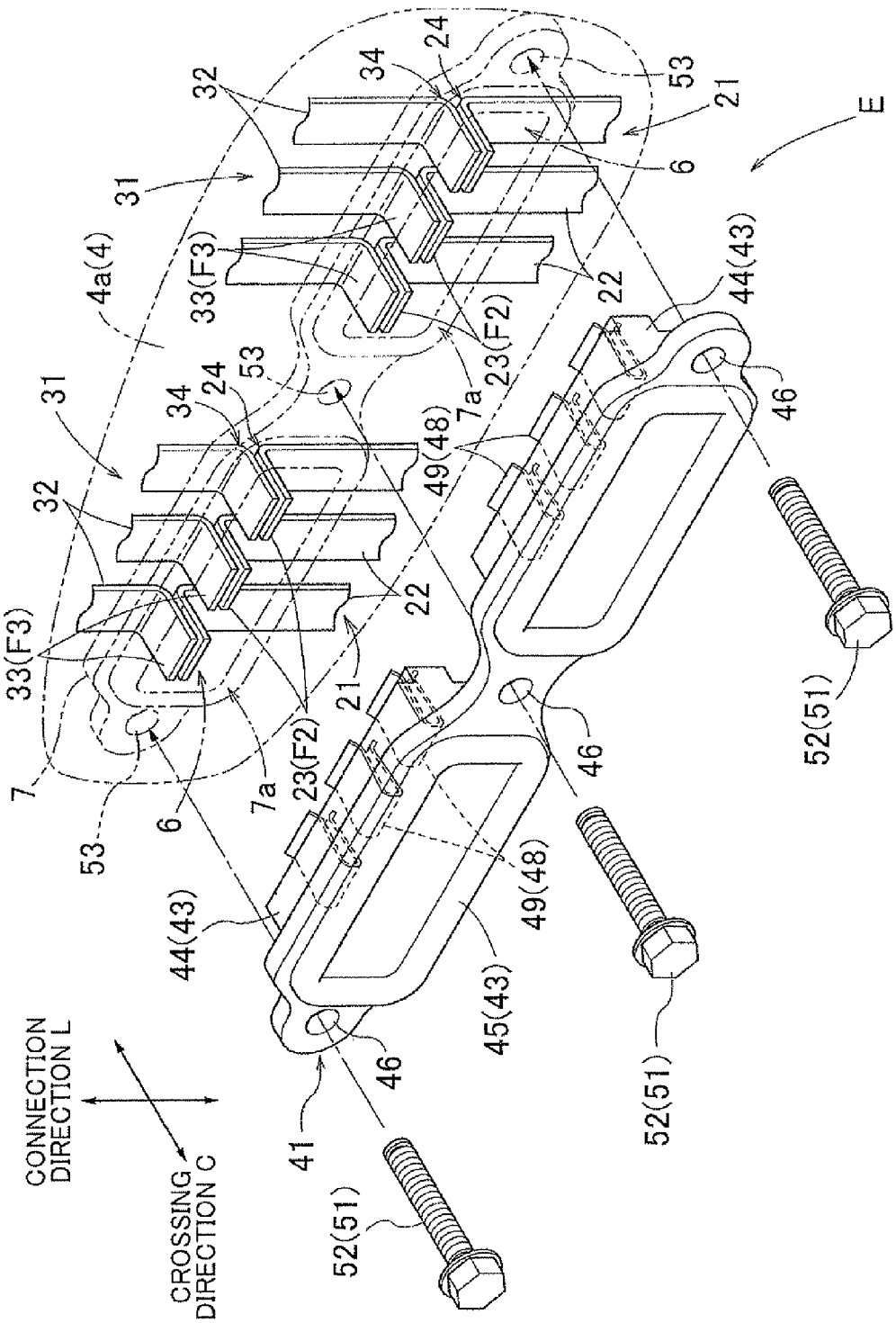
FIG. 4 is a perspective view of the electrical connection device according to the embodiment of the present invention.

The connection member 41 includes the main body 43, pinching portions 48, and fixing portions 51. The main body 43 is a main portion that serves as a base of the connection member 41, and is made of an insulating resin material (e.g., a PPS resin or an epoxy resin). In this example, as shown in FIG. 4, the main body 43 includes two holding portions 44, and a single cover portion 45 that is fixed to the two holding portions 44. Each holding portion 44 has a substantially rectangular parallelepiped shape, and the outer dimension of the holding portion 44 is smaller than the inner dimension of the opening 6. This enables the two holding portions 44 of the main body 43 to enter the inverter accommodating space S2 through the two openings 6 of the inverter case 4, respectively. The pinching portions 48, described below, are held by and fixed to the holding portions 44. The cover portion 45 is large enough to cover at least a range larger than the sum of the opening widths of the two openings 6. The cover portion 45 completely covers the openings 6 when the holding portions 44 enter the inverter accommodating space S2 through the openings 6. A plurality of insertion holes 46 are formed in the cover portion 45. In this example, three insertion holes 46 are formed at the center of the cover member 45, and in both ends of the cover member 45 in a width direction. Fastening bolts 52 are respectively inserted through the insertion holes 46 such that shafts of the fastening bolts 52 face the inverter case 4.

In the present embodiment, the fixing portions 51 are formed by the fastening bolts 52. The fastening bolts 52 extend along the crossing direction C, and are screwed into the insertion holes 46 and bolt fastening holes 53. The bolt fastening holes 53 are formed in the inverter case 4 so as to correspond to the positions of the fastening bolts 52. The main body 43 moves along the crossing direction C as the fastening bolts 52 are screwed into, or screwed out of the bolt fastening holes 53. That is, as the fastening bolts 52 are screwed into the bolt fastening holes 53, the main body 43 moves forward (to the right in FIGS. 1 and 2) in an entering direction along the crossing direction C. As the fastening bolts 52 are screwed out of the bolt fastening holes 53, the main body 43 moves backward (to the left in FIGS. 1 and 2) in the entering direction along the crossing direction C. Note that the fastening bolts 52 are screwed into the bolt fastening holes 53 until the cover portion 45 contacts seat surfaces 7a of seat portions 7 formed around each opening 6 of the inverter case 4. In this state, the main body 43 is fixed to the inverter case 4.

The pinching portions 48 are held by, and fixed to the front sides of the holding portions 44 in the entering direction into the inverter accommodating space S2. Each pinching portion 48 is structured to pinch the opposing portion F2 of the first bus bar 21 and the opposing portion F3 of the second bus bar 31 as the holding portions 44 move forward in the entering direction. In the present embodiment, each pinching portion 58 is formed by a clip member 49 that is capable of pressing the opposing portion F2 of the first bus bar 21 and the opposing portion F3 of the second bus bar 31 toward each other (in this example, in a direction corresponding the connection direction L). In this example, as viewed from the lateral direction of the bus bars, each clip member 49 has a substantially U-shaped cross section, which opens forward in the entering direction along the crossing direction C and widens toward the end. Both top ends of the substantially U-shaped clip member 49 pinch the opposing portion F2 of the first bus bar 21 and the opposing portion F3 of the second bus bar F3 from outside in the connection direction L, and press the opposing portion F2 and the opposing portion F3 toward each other. This pressing force of the clip member 49 elastically deforms the first bus bar 21 and the second bus bar 31 to bring the opposing portion F2 of the first bus bar 21 and the opposing portion F3 of the second bus bar 31 into contact with each other. This provides electrical conduction between the first bus bar 21 and the second bus bar 31. Thus, the gap D between the opposing portion F2 of the first bus bar 21 and the opposing portion F3 of the second bus bar F3 is such that at least electrical insulation between the first bus bar 21 and the second bus bar 31 is ensured, and at least two opposing portions F2, F3 can be brought into contact with each other by elastic deformation of the first bus bar 21 and the second bus bar 31. Such a gap D is, e.g., 2 to 5 mm.

In the electrical connection device E of the present embodiment having the above structure, the opposing portions F2 of the first bus bars 21 and the opposing portions F3 of the second bus bars 31 can be pinched by the clip members 49 by merely partially inserting the main body 43 of the connection member 41 through the inverter case 4 into the inverter accommodating space S2 along the crossing direction C (i.e., by merely moving the main body 43 of the connection member 41 forward in the entering direction). That is, as the main body 43 of the connection member 41 moves into the inverter accommodating space S2 along the crossing direction C, each pair of opposing portions F2, F3 are inserted into the clip members 49 from their openings located forward in the entering direction. Thus, as the connection member 41 moves along the crossing direction C, the connection member 41 can automatically pinch the opposing portions F2 of the first bus bars 21 and the opposing portions F3 of the second bus bars F3. This enables the rotating electrical machines 11 and the inverter device 16 to be electrically connected together in the case 2 by a simple structure. On the contrary, the opposing portions F2 of the first bus bars 21 and the opposing portions F3 of the second bus bars 31 can be released from the clip members 49 by merely withdrawing the main body 43 of the connection member 41, which partially extends through the inverter case 4, along the crossing direction C (i.e., by merely moving the main body 43 of the connection member 41 backward in the entering direction). This enables the rotating electrical machines 11 and the inverter device 16 to be electrically disconnected from each other in the case 2 by a simple structure.

In the electrical connection device E of the present embodiment, the operation of electrically connecting and disconnecting the rotating electrical members 11 and the inverter device 16 to and from each other can be performed by advancing and withdrawing the connection member 41, which is made of an insulating resin material, along the crossing direction C, rather than by directly connecting and disconnecting the opposing portions F2 of the first bus bars 21 and the opposing portions F3 of the second bus bars 31 to and from each other with bolts or the like. This increases safety of the operation.

Moreover, in the electrical connection device E of the present embodiment, the first bus bars 21 and the second bus bars 31 have the crossing direction extending portions 23, 33 that extend continuously from the connection direction extending portions 22, 32 toward the sidewall 4a of the inverter case 4, and the crossing direction extending portions 23, 33 serve as the opposing portions F2 of the first bus bars 21 and the opposing portions F3 of the second bus bars 31. Thus, as the connection member 41 moves along the crossing direction C, which is the extending direction of the fastening bolts 52, the opposing portions F2 of the first bus bars 21 and the opposing portions F3 of the second bus bars F3 can be easily pinched or released from the inverter case 4 side. In this case, in the present embodiment, the clip members 49 are capable of pressing the opposing portions F2 of the first bus bars 21 and the opposing portions F3 of the second bus bars 31 toward each other along the connection direction L. Thus, the connection member 41 does not cooperate with other members in the case 2 to electrically connect the rotating electrical machines 11 and the inverter device 16. This is advantageous in that the rotating electrical machines 11 and the inverter device 16 can be easily electrically connected together by pinching the opposing portions F2 of the first bus bars 21 and the opposing portions F3 of the second bus bars 31 by using only the connection member 41.

In the drive device 1 of the present embodiment, the drive device case 3 and the inverter case 4 can be separated from each other in a state in which the opposing portions F2 of the first bus bars 21 and the opposing portions F3 of the second bus bars 31 are released from the connection member 41. Thus, as described above, the rotating electrical machines 11 fixed to the drive device case 3, and the inverter device 16 fixed to the inverter case 4 can be separated from each other, after the rotating electrical machines 11 and the inverter device 16 are electrically disconnected from each other in the case 2 in a simple manner. This facilitates, e.g., maintenance such as inspection or service since maintenance work can be performed on an individual component (the rotating electrical machine 11 or the inverter device 16), rather than being performed on the combination of the rotating electrical machines 11 and the inverter device 16. This also facilitates replacement of parts due to failures or the like, since the replacement can be performed on an individual component (the rotating electrical machine 11 or the inverter device 16). This can reduce costs for maintenance and inspection, and for repair and replacement, which is advantageous for users as well.

As described above, in the present embodiment, the drive device 1 includes two rotating electrical machines 11 that are driven by a three-phase alternating current. Thus, two sets of three pairs of first and second bus bar 21, 31 are provided for the two rotating electrical machines 11. As shown in FIG. 3, the two sets of three pairs of first and second bus bar 21, 31 are positioned so as to adjoin each other in the width direction. At this time, each set of three pairs of opposing portions F2, F3 of the first and second bus bars 21, 31 is positioned so as to completely overlap the corresponding one of the openings 6 when viewed from the crossing direction C. The present embodiment is structured so that the single connection member 41 pinches all of a total of six pairs of opposing portions F2, F3 of the first and second bus bars 21, 31, which are positioned so as to adjoin each other. That is, three clip members 49 corresponding to the three pairs of opposing portions F2, F3 are held by, and fixed to each of the two holding portions 44 of the connection member 44. Thus, the total of six clip members 49 are fixed to the single cover member 45 via the holding portions 44, and pinch all of the six pairs of opposing portions F2, F3 of the first and second bus bars 21, 31, respectively. This enables connection and disconnection between the first bus bars 21 and the second bus bars 31, and thus between the rotating electrical machines 11 and the inverter device 16, to be implemented with a reduced number of steps, thereby improving workability.

Figure 5:
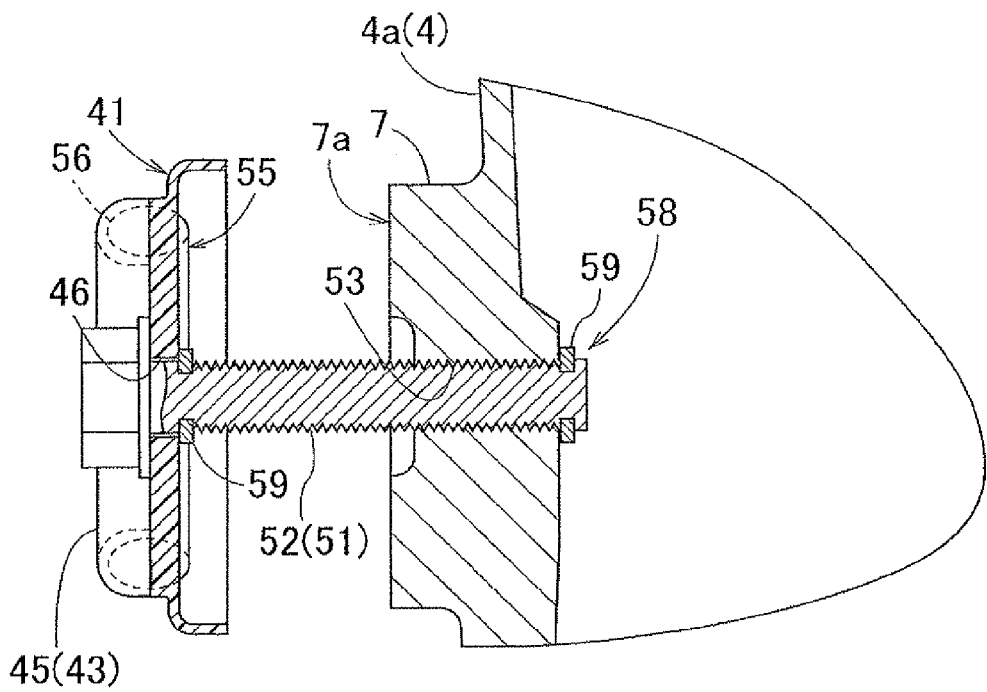
FIG. 5 is a partial cross-sectional view of the drive device according to the embodiment of the present invention, showing a state in which the connection member is moved backward in the entering direction.
Figure 6:
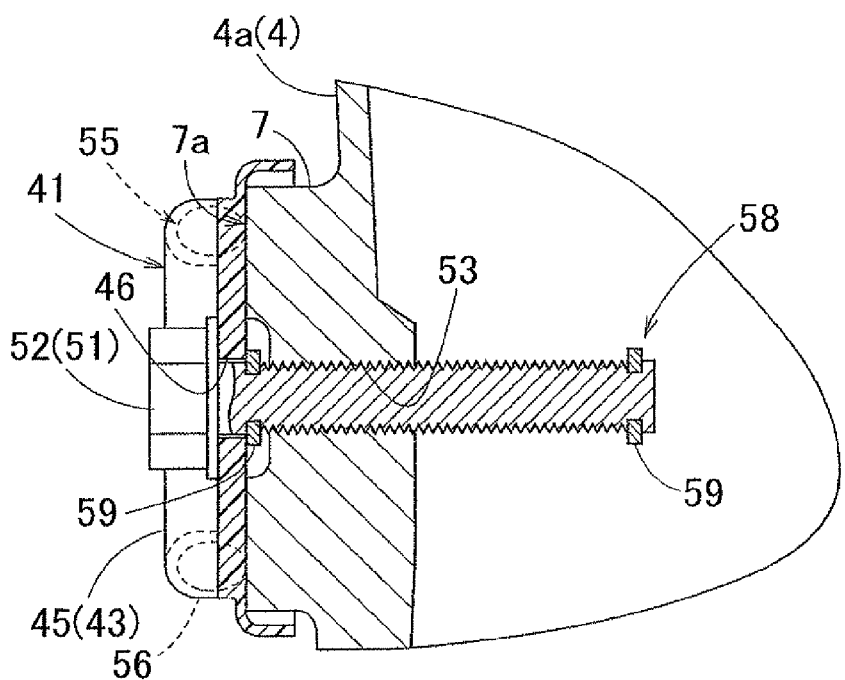
FIG. 6 is a partial cross-sectional view of the drive device according to the embodiment of the present invention, showing a state in which the connection member is moved forward in the entering direction.

In the present embodiment, as shown in FIGS. 5 and 6, the connection member 41 further includes a seal mechanism 55. The seal mechanism 55 seals the connection member 41 and the inverter case 4 in a fluid-tight state when the main body 43 moves forward in the entering direction, and pinches the opposing portions F2, F3 of the first and second bus bars 21, 31 by the clip members 49 as the pinching portions 48. In the present embodiment, the fastening bolts 52 are screwed into the bolt fastening holes 53 until the cover portion 45 contacts the seat surfaces 7a of the seat portions 7 formed around each opening 6 of the inverter case 4, whereby the main body 43 is fixed to the inverter case 4. In this state, an O-ring 56 as a sealing member is positioned between the cover portion 45 and the seat surface 7a of each seat portion 7. This can reduce the possibility that a liquid such as water or oil enters the inverter accommodating space S2 through a gap between the connection member 41 and the inverter case 4, whereby the inverter device 16 accommodated in the inverter accommodating space S2 can be appropriately protected.

In the present embodiment, as shown in FIGS. 5 and 6, the connection member 41 further includes a stopper mechanism 58. The stopper mechanism 58 prevents the connection member 41 from coming off from the inverter case 4 in a state in which the main body 43 moves backward in the entering direction and the opposing portions F2, F3 are released from the clip members 49. In the present embodiment, E-rings 59 are fixed to a position near the front ends of the shafts of the fastening bolts 52 in the entering direction. The E-rings 59 are provided as restricting members having an outer diameter larger than the inner diameter of the bolt fastening holes 53. Thus, even if the main body 43 moves backward in the entering direction, the E-rings 59 contact the end face on the inverter accommodating space S2 side of the inverter case 4, whereby the connection member 41 can be prevented from coming off from the inverter case 4.

Since the connection member 41 is prevented from coming off from the inverter case 4, the connection member 41 is always positioned at the openings 6. This significantly limits access to the first bus bars 21 and the second bus bars 31 through the openings 6. Moreover, in the present embodiment, the gap between each opening 6 and each holding portion 44 that forms a part of the main body 43 is less than an average thickness of an adult's finger in a state in which the pairs of opposing portions F2, F3 are released from the clip members 49. This structure substantially reliably prevents access to the first bus bars 21 and the second bus bars 31 through the openings 6 during the operations of connecting and disconnecting the first bus bars 21 and the second bus bars 31 to and from each other, thereby significantly increasing the safety of the operations. This structure eliminates the need to separately provide an interlock mechanism (e.g., a mechanism that detects when the inverter cover 5 is removed from the inverter case 4, and automatically setting an applied voltage to zero) in order to ensure safety. This can simplify the structure of the drive device 1 that incorporates the electrical connection device E therein, and can also reduce manufacturing cost.

Figure 7:
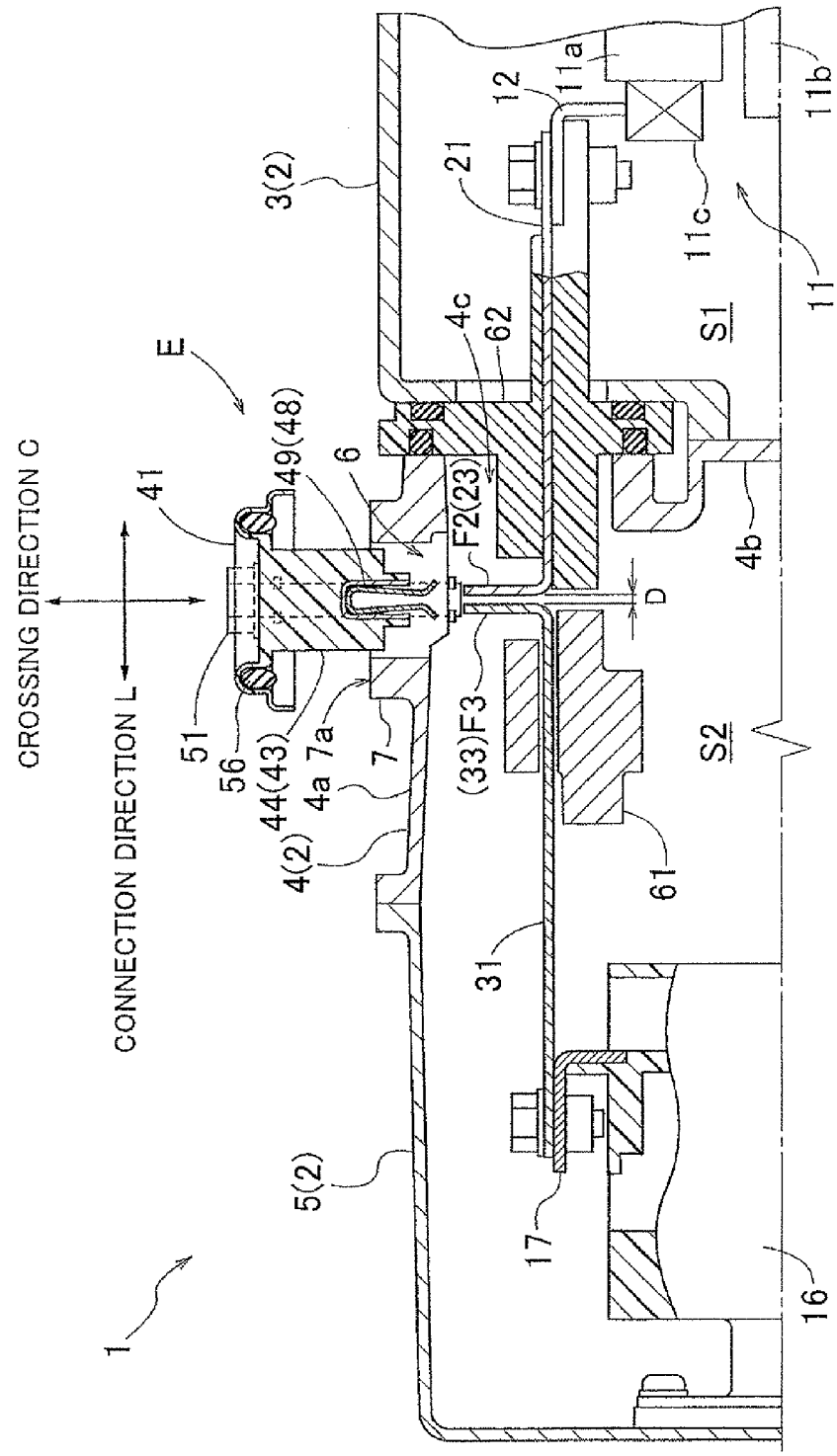
FIG. 7 is a partial cross-sectional view of an electrical connection device according to another embodiment of the present invention.

Other Embodiments (1) In the above embodiment, the rotating electrical machine terminals 12 are positioned above the inverter terminals 17 in the vertical direction (the up-down direction in FIGS. 1 and 2), and this vertical direction corresponds to the connection direction L. However, embodiments of the present invention are not limited to this. That is, as shown in, e.g., FIG. 7, it is also one of preferred embodiments of the present invention that the rotating electrical machines 11 and the inverter device 16 be positioned in an axial direction of the rotation shaft of the rotor 11b of the rotating electrical machine 11 (the left-right direction in FIG. 7) in the case 2, and the rotating electrical machine terminals 12 and the inverter terminals 17 be positioned along the axial direction, and thus, the axial direction correspond to the connection direction L. In this case, if the crossing direction extending portions 23 as the opposing portions F2 of the first bus bars 21, and the crossing direction extending portions 33 as the opposing portions F3 of the second bus bars 31 extend in a vertical direction (the up-down direction in FIG. 7), it is preferable that the connection member 41 extend through the inverter cover 5 from its upper side in the vertical direction, and enter the inverter accommodating space S2.

Figure 8:
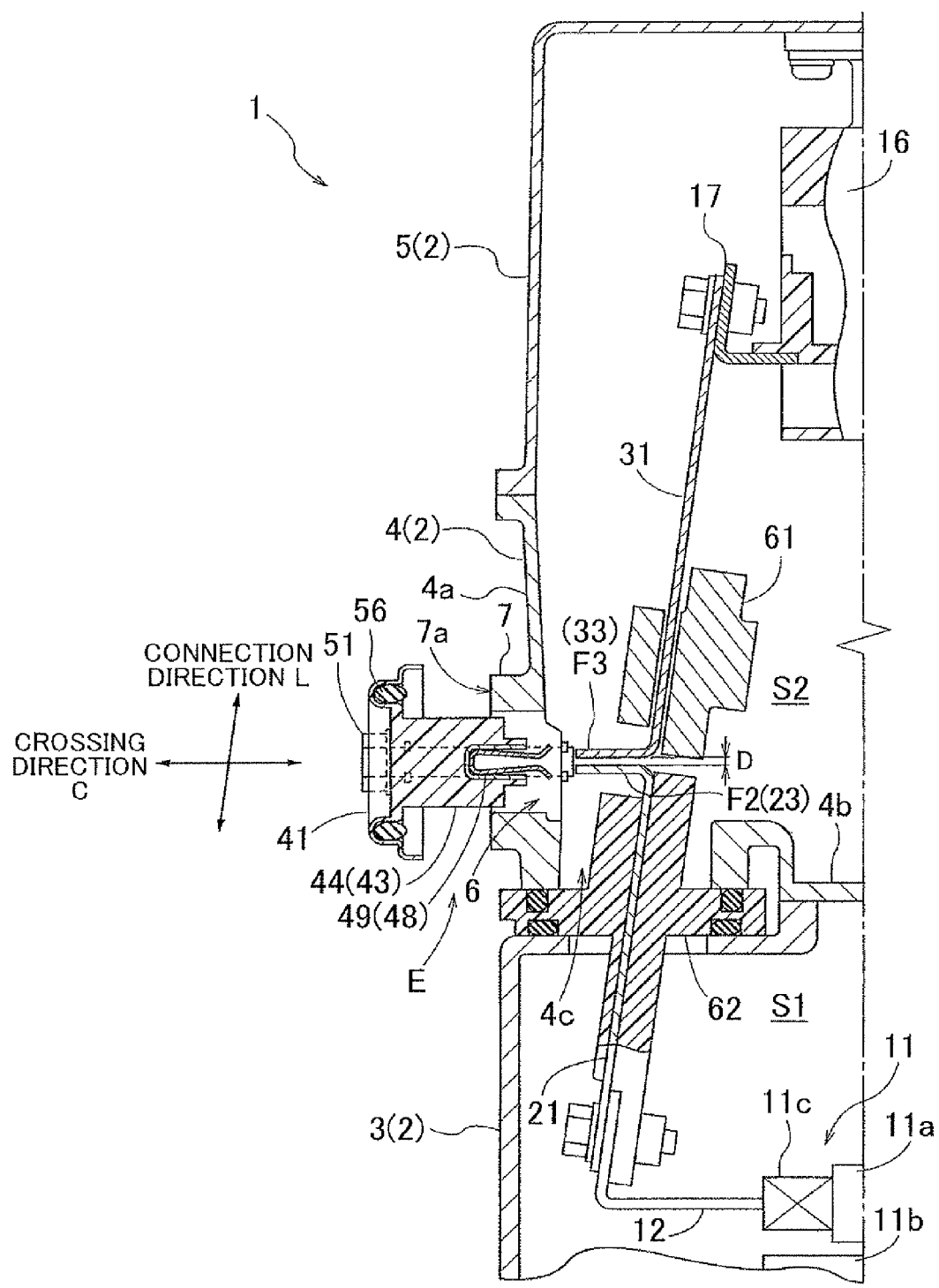
FIG. 8 is a partial cross-sectional view of an electrical connection device according to still another embodiment of the present invention.

(2) In the above embodiment, the crossing direction C is substantially perpendicular to the connection direction L. That is, the connection direction L and the crossing direction C are substantially perpendicular to each other. However, embodiments of the present invention are not limited to this. That is, as shown in, e.g., FIG. 8, it is also one of preferred embodiments of the present invention that the connection direction L and the crossing direction C cross each other at an angle other than substantially 90°. In this case, it is preferable that the entering direction of the connection member 41, in which the connection member 41 extends through a wall of the case 2 along the crossing direction C and enters the inverter accommodating space S2, be substantially perpendicular to the sidewall 4a of the inverter case 4 (in this example, the horizontal direction, the left-right direction in FIG. 8). Thus, it is preferable that the connection direction L be oblique to the vertical direction.

(3) In the above embodiment, the first bus bars 21 have the connection direction extending portions 22 and the crossing direction extending portions 23, and the second bus bars 31 have the connection direction extending portions 32 and the crossing direction extending portions 33, and the crossing direction extending portions 23 of the first bus bars 21 and the crossing direction extending portions 33 of the second bus bars 31 are used as the opposing portions F2 of the first bus bars 21 and the opposing portions F3 of the second bus bars 31. However, embodiments of the present invention are not limited to this. That is, for example, it is also one of preferred embodiments of the present invention that the first bus bars 21 and the second bus bars 31 have no crossing direction extending portions 23, 33, and have only the connection direction extending portions 22, 32, and parts of the connection direction extending portions 22 of the first bus bars 21 and parts of the connection direction extending portions 32 of the second bus bars 31 be used as the opposing portions F2 of the first bus bars 21 and the opposing portions F3 of the second bus bars 31. In this case, it is preferable that the connection member 41 extend through the inverter case 4 in the lateral direction of the first and second bus bars 21, 31 to enter the inverter accommodating space S2, and the connection member 41 pinch the opposing portions F2 of the first bus bars 21 and the opposing portions F3 of the second bus bars 31 in a direction perpendicular to the connection direction.

(4) In the above embodiment, the connection member 41 is provided with the clip members 49 as the pinching portions 48, so that the opposing portions F2 of the first bus bars 21 and the opposing portions F3 of the second bus bars 31 can be pinched and brought into contact with each other by using only the connection member 41. However, embodiments of the present invention are not limited to this. That is, it is also one of preferred embodiments of the present invention that the connection member 41 cooperate with, e.g., other members fixedly positioned in the inverter accommodating space S2 to pinch the opposing portions F2 of the first bus bars 21 and the opposing portions F3 of the second bus bars 31.

(5) In the above embodiment, the pinching portions 48 are formed by the clip members 49 capable of pressing the opposing portions F2 of the first bus bars 21 and the opposing portions F3 of the second bus bars 31 toward each other. However, embodiments of the present invention are not limited to this. That is, any specific structure can be used for the pinching portions 48. For example, it is one of preferred embodiments of the present invention that the pinching portions 48 be formed by a combination of a plurality of elastic members (e.g., leaf springs), or the like.

(6) In the above embodiment, the fixing portions 51 are formed by the fastening bolts 52, which extend in the crossing direction C, are inserted through the cover portion 45 as a part of the main body 43, and screwed into the bolt fastening holes 53 formed in the inverter case 4. However, embodiments of the present invention are not limited to this. That is, any specific structure can be used for the fixing portions 51. For example, it is also one of preferred embodiments of the present invention that the fixing portions 51 be formed by fastening bolts 53, which extend in the crossing direction C, fit in bolt fastening holes 53 formed in the cover portion 45 as a part of the main body 43, and are inserted through the inverter case 4. In this case, it is preferable that the E-rings as restricting members be provided in contact with the sidewall 4a of the inverter case 4 from both sides of the inverter case 4, and the main body 43 be capable of advancing and withdrawing along the crossing direction C with the fastening bolts 52 located at a fixed position relative to the inverter case 4. It is also one of preferred embodiments of the present invention that the fixing portions 51 be formed by engaging members or the like that engage with and fixed to engaged members formed in the inverter case 4.

(7) In the above embodiment, the cover member 45, the inverter case 4, and the O-rings 56 as seal members positioned between the cover portion 45 and the seat surfaces 7a of the seat portions 7 cooperate with each other to form the seal mechanism 55. However, embodiments of the present invention are not limited to this. That is, any specific structure can be used for the seal mechanism 55. For example, it is also one of preferred embodiments of the present invention that the seal mechanism 55 be formed by using other gaskets such as elastic sheets as seal members positioned between the cover portion 45 and the seat surfaces 7a of the seat portions 7, instead of using the O-rings 56 in the above embodiment.

(8) In the above embodiment, the stopper mechanism 58 is formed by the B-rings 59 as restricting members, which are fixed to a position near the front ends of the shafts of the fastening bolts 52 in the entering direction, and have an outer diameter larger than the inner diameter of the bolt fastening holes 53. However, embodiments of the present invention are not limited to this. That is, any specific structure can be used for the stopper mechanism 58. For example, it is also one of preferred embodiments of the present invention that the stopper mechanism 58 be formed by pin members or the like as restricting members provided so as to radially extend through the shafts of the fastening bolts 52, instead of the E-rings 59 in the above embodiment.

(9) In the above embodiment, the openings 6 are formed in the sidewall 4a of the inverter case 4 so that the main body 43 of the connection member 41 can enter the inverter accommodating space S2 through the inverter case 4. However, embodiments of the present invention are not limited to this. That is, such openings 6 need only be formed at any positions of the case 2, and for example, it is also one of preferred embodiments of the present invention that the opening 6 be formed in the inverter cover 5 so that the space outside the drive device 1 and the inverter accommodating space S2 communicate with each other through the opening 6, or that the opening 6 be formed in the drive device case 3 so that the space outside the drive device 1 and the motor accommodating space S1 communicate with each other through the opening 6.

(10) In the above embodiment, two openings 6 are formed in the sidewall 4a of the inverter case 4, and the connection member 41 include two holding portions 44 that enter the inverter accommodating space S2 through the two openings 6, respectively. However, embodiments of the present invention are not limited to this. That is, for example, it is also one of preferred embodiments of the present invention that only one opening 6 be formed in the sidewall 4a of the inverter case 4, and thus the connection member 41 include only one holding portion 44 that enters the inverter accommodating space S2 through the single opening 6. In this case, if a total of six pairs of opposing portions F2, F3 of the first and second bus bars 21, 31 are positioned so as to adjoin each other in the width direction as in the above embodiment, it is preferable that six clip members 49, which are held by and fixed to the single holding portion 44, pinch all of the six pairs of opposing portions F2, F3 of the first and second bus bars 21, 31, respectively.

(11) In above embodiment, the single connection member 41 pinches all of the total of six pairs of opposing portions F2, F3 of the first and second bus bars 21, 31, which are positioned so as to adjoin each other in the lateral direction. More specifically, in the above embodiment, the six clip members 49, which are fixed to the single cover member 45 via the holding portions 44, pinch the six pairs of opposing portions F2, F3 of the first and second bus bars 21, 31, respectively. However, embodiments of the present invention are not limited to this. That is, for example, it is also one of preferred embodiments of the present invention that, in the case where the six pairs of opposing portions F2, F3 of the first and second bus bars 21, 31 are provided, one connection member 41 be provided for every three pairs of opposing portions F2, F3 of the first and second bus bars 21, 31 corresponding to one rotating electrical machine 11 (two connection members 41 be provided in total), or that one connection member 41 be provided for each pair of opposing portions F2, F3 of the first and second bus bars 21, 31 (six connection members 41 be provided in total).

(12) In the above embodiment, the connection member 41 is moved into the inverter accommodating space S2 through the openings 6 in a state in which the inverter accommodating space S2 communicates with the outside (the space outside the drive device 1) only through the openings 6. However, embodiments of the present invention are not limited to this. That is, for example, the connection member 41 may be moved into the inverter accommodating space S2 through the openings 6 in a state in which the inverter accommodating space S2 communicates with the outside not only through the openings 6, but also through an opening portion at the top of the inverter case 4, which is obtained by removing the inverter cover 5 from the inverter case 4. In this case, it is preferable that an interlock mechanism be separately provided in the drive device 1 in order to ensure safety. However, this structure has at least an advantage that the rotating electrical machines 11 and the inverter device 16 can be electrically connected and disconnected to and from each other in the case 2 by merely advancing and withdrawing the connection member 41 along the crossing direction C.

(13) In the above embodiment, the opposing portions F2 of the first bus bars 21 and the opposing portions F3 of the second bus bars 31 are automatically pinched as the main body 43 of the connection member 41 is moved into the inverter accommodating space S2 along the crossing direction C. However, embodiments of the present invention are not limited to this. That is, for example, it is also one of preferred embodiments of the present invention that an operation of moving the connection member 41 along the crossing direction. C and an operation of pinching the opposing portions F2 of the first bus bars 21 and the opposing portions F3 of the second bus bars 31 by the clip members 49 be performed as separate, independent operations.

(14) In the above embodiment, the electrical connection device E of the present invention is applied to a two-motor type hybrid drive device that includes an engine and two rotating electrical machines 11 as a driving source. However, embodiments of the present invention are not limited to this. That is, for example, it is also preferable to apply the electrical connection device E of the present invention to a one-motor type hybrid drive device that includes an engine and one rotating electrical machine 11 as a driving source, or to a drive device for electric vehicles that includes only the rotating electrical machine 11 as a driving source. The electrical connection device E of the present invention may be applied not only to vehicle drive devices, but also to various devices and instruments that have the rotating electrical machine 11 and the inverter device 16 in the case 2.

The present invention is preferably used in an electrical connection device for electrically connecting a rotating electrical machine and an inverter device in a case that accommodates the rotating electrical machine and the inverter device for controlling the rotating electrical machine.

What is claimed is:

1. An electrical connection device for electrically connecting a rotating electrical machine and an inverter device in a case that accommodates the rotating electrical machine and the inverter device that controls the rotating electrical machine, comprising:
   a first bus bar connected to a terminal of the rotating electrical machine in a state in which the first bus bar is insulated from the case;
   a second bus bar connected to a terminal of the inverter device in a state in which the second bus bar is insulated from the case; and
   an insulating connection member that connects the first bus bar and the second bus bar, wherein
   the first bus bar and the second bus bar have opposing portions, respectively, and in a state in which the first bus bar and the second bus bar are accommodated in a space inside the case, which is isolated from outside by the case, the opposing portions of the first bus bar and the second bus bar are positioned so as to face each other with a gap therebetween, and
   the connection member enters the space inside the case through a wall of the case, and pinches the opposing portions of the first bus bar and the second bus bar to electrically connect between the opposing portions.

2. The electrical connection device according to claim 1, wherein
   a direction in which the terminal of the rotating electrical machine and the terminal of the inverter device are connected is a connection direction,
   each of the first bus bar and the second bus bar has a connection direction extending portion that extends along the connection direction, and a crossing direction extending portion that extends continuously from the connection direction extending portion toward the wall of the case along a crossing direction that crosses the connection direction,
   the crossing direction extending portions of the first bus bar and the second bus bar respectively serve as the opposing portions that face each other in a direction perpendicular to the crossing direction, and
   the connection member enters the space inside the case along the crossing direction to pinch the opposing portions of the first bus bar and the second bus bar.

3. The electrical connection device according to claim 2, wherein
the connection member includes a main body made of an insulating material, a pinching portion provided on a front side of the main body in an entering direction in which the connection member enters the space inside the case, and a fixing portion that fixes the main body to the case,
the main body is formed so that the main body can be inserted into an opening formed in the case, and
the pinching portion pinches the opposing portions of the first bus bar and the second bus bar as the main body moves forward in the entering direction.

4. The electrical connection device according to claim 3, wherein
the connection member is structured so as to enter the space inside the case through the opening in a state in which the space inside the case communicates with the outside only through the opening, and
the connection member has a stopper mechanism that prevents the connection member from coming off from the case in a state in which the main body is moved backward in the entering direction and the opposing portions of the first bus bar and the second bus bar are released from the pinching portion.

5. The electrical connection device according to claim 4, wherein
the connection member has a seal mechanism that seals the connection member and the case in a fluid-tight manner in a state in which the main body is moved forward in the entering direction and the opposing portions of the first bus bar and the second bus bar are pinched by the pinching portion.

6. The electrical connection device according to claim 5, wherein
the fixing portion is formed by a fastening bolt, which extends in the crossing direction, inserted through the main body, and screwed into a bolt fastening hole formed in the case, and
as the fastening bolt is screwed into the bolt fastening hole, the main body is moved forward in the entering direction along the crossing direction.

7. The electrical connection device according to claim 6, wherein
the pinching portion is formed by a clip member that is capable of pressing the opposing portions of the first bus bar and the second bus bar toward each other.

8. The electrical connection device according to claim 7, wherein
the gap between the opposing portions of the first bus bar and the second bus bar is set such that electrical insulation between the first bus bar and the second bus bar can be ensured in a state in which the rotating electrical machine and the inverter device are positioned and fixed in the space inside the case.

9. The electrical connection device according to claim 8, wherein
a plurality of pairs of the first bus bar and the second bus bar are provided, and
the single connection member pinches all of the opposing portions of the plurality of pairs of the first bus bar and the second bus bar, which are positioned so as to adjoin each other.

10. The electrical connection device according to claim 9, wherein
the case includes a first case, and a second case fixedly fastened to the first case,
the rotating electrical machine is fixed to the first case, and the inverter device is fixed to the second case, and
the first case and the second case are separable from each other in a state in which the opposing portions of the first bus bar and the second bus bar are released from the connection member.

11. The electrical connection device according to claim 4, wherein
the fixing portion is formed by a fastening bolt, which extends in the crossing direction, inserted through the main body, and screwed into a bolt fastening hole formed in the case, and
as the fastening bolt is screwed into the bolt fastening hole, the main body is moved forward in the entering direction along the crossing direction.

12. The electrical connection device according to claim 4, wherein
the pinching portion is formed by a clip member that is capable of pressing the opposing portions of the first bus bar and the second bus bar toward each other.

13. The electrical connection device according to claim 3, wherein
the connection member has a seal mechanism that seals the connection member and the case in a fluid-tight manner in a state in which the main body is moved forward in the entering direction and the opposing portions of the first bus bar and the second bus bar are pinched by the pinching portion.

14. The electrical connection device according to claim 13, wherein
the fixing portion is formed by a fastening bolt, which extends in the crossing direction, inserted through the main body, and screwed into a bolt fastening hole formed in the case, and
as the fastening bolt is screwed into the bolt fastening hole, the main body is moved forward in the entering direction along the crossing direction.

15. The electrical connection device according to claim 13, wherein
the pinching portion is formed by a clip member that is capable of pressing the opposing portions of the first bus bar and the second bus bar toward each other.

16. The electrical connection device according to claim 3, wherein
the fixing portion is formed by a fastening bolt, which extends in the crossing direction, inserted through the main body, and screwed into a bolt fastening hole formed in the case, and
as the fastening bolt is screwed into the bolt fastening hole, the main body is moved forward in the entering direction along the crossing direction.

17. The electrical connection device according to claim 3, wherein
the pinching portion is formed by a clip member that is capable of pressing the opposing portions of the first bus bar and the second bus bar toward each other.

18. The electrical connection device according to claim 1, wherein
the gap between the opposing portions of the first bus bar and the second bus bar is set such that electrical insulation between the first bus bar and the second bus bar can be ensured in a state in which the rotating electrical machine and the inverter device are positioned and fixed in the space inside the case.

19. The electrical connection device according to claim 1, wherein a plurality of pairs of the first bus bar and the second bus bar are provided, and the single connection member pinches all of the opposing portions of the plurality of pairs of the first bus bar and the second bus bar, which are positioned so as to adjoin each other.

20. The electrical connection device according to claim 1, wherein the case includes a first case, and a second case fixedly fastened to the first case, the rotating electrical machine is fixed to the first case, and the inverter device is fixed to the second case, and the first case and the second case are separable from each other in a state in which the opposing portions of the first bus bar and the second bus bar are released from the connection member.

* * * * *